United States Patent
Hakeem et al.

(10) Patent No.: US 10,167,234 B2
(45) Date of Patent: Jan. 1, 2019

(54) METHOD OF MAKING AN ALUMINA-SILICATE OXYNITRIDE AND CUBIC BORON NITRIDE CERAMIC COMPOSITE

(71) Applicant: KING FAHD UNIVERSITY OF PETROLEUM AND MINERALS, Dhahran (SA)

(72) Inventors: Abbas Saeed Hakeem, Dhahran (SA); Tahar Laoui, Dhahran (SA); Muhammad Ali Ehsan, Dhahran (SA); Bilal Anjum Ahmed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/833,020

(22) Filed: Dec. 6, 2017

(65) Prior Publication Data
US 2018/0155250 A1 Jun. 7, 2018

Related U.S. Application Data

(60) Provisional application No. 62/430,578, filed on Dec. 6, 2016.

(51) Int. Cl.
*C04B 35/599* (2006.01)
*C04B 35/626* (2006.01)
(Continued)

(52) U.S. Cl.
CPC ...... *C04B 35/62635* (2013.01); *C04B 35/597* (2013.01); *C04B 35/62615* (2013.01);
(Continued)

(58) Field of Classification Search
CPC .......................... C04B 35/597; C04B 35/5831
See application file for complete search history.

(56) References Cited

U.S. PATENT DOCUMENTS

| 5,891,815 A | 4/1999 | Dodds et al. |
| 9,764,988 B1 | 9/2017 | Hakeem et al. |
| (Continued) | | |

FOREIGN PATENT DOCUMENTS

| CN | 101054296 A | 10/2007 |
| CN | 102093058 A | 6/2011 |
| (Continued) | | |

OTHER PUBLICATIONS

B. Ahmed, et al., "Spark Plasma Sintering of Ca-α-Sialon Matrix Reinforced with Cubic Boron Nitride Particles", The 4th Saudi International Nanotechnology Conference (SINC 2016), Oct. 25-27, 2016, 1 page.

(Continued)

*Primary Examiner* — Karl E Group
(74) *Attorney, Agent, or Firm* — Oblon, McClelland, Maier & Neustadt, L.L.P.

(57) ABSTRACT

A method for producing a composite of cubic boron nitride dispersed in a SiAlON ceramic. This method involves mixing silicon nitride nanoparticles, aluminum nitride nanoparticles, silica nanoparticles, calcium oxide nanoparticles, and cubic boron nitride microparticles to produce a mixture. The cubic boron nitride may be coated with nickel. The mixture is sintered to produce the composite, and this sintering may involve spark plasma sintering and/or sintering at a relatively low temperature. The composite may comprise a mixture of Ca-α-SiAlON and β-SiAlON ceramic reinforced by boron nitride in either or both cubic and hexagonal phases.

20 Claims, 8 Drawing Sheets

(51) Int. Cl.
C04B 35/597 (2006.01)
C04B 35/628 (2006.01)
C04B 35/645 (2006.01)

(52) U.S. Cl.
CPC .. *C04B 35/62625* (2013.01); *C04B 35/62842* (2013.01); *C04B 35/645* (2013.01); C04B 2235/3206 (2013.01); C04B 2235/3418 (2013.01); C04B 2235/386 (2013.01); C04B 2235/3865 (2013.01); C04B 2235/3878 (2013.01); C04B 2235/405 (2013.01); C04B 2235/5436 (2013.01); C04B 2235/5445 (2013.01); C04B 2235/5454 (2013.01); C04B 2235/6562 (2013.01); C04B 2235/6565 (2013.01); C04B 2235/6567 (2013.01); C04B 2235/666 (2013.01); C04B 2235/762 (2013.01); C04B 2235/766 (2013.01); C04B 2235/767 (2013.01); C04B 2235/80 (2013.01); C04B 2235/96 (2013.01)

(56) References Cited

U.S. PATENT DOCUMENTS

| | | | | |
|---|---|---|---|---|
| 10,000,421 | B2* | 6/2018 | Hakeem | C04B 35/645 |
| 2006/0166808 | A1* | 7/2006 | Nose | B22D 11/066 |
| | | | | 501/96.4 |
| 2010/0129168 | A1* | 5/2010 | Waki | C23C 14/0641 |
| | | | | 407/119 |
| 2017/0341153 | A1* | 11/2017 | Chihara | B23B 27/14 |
| 2018/0194687 | A1* | 7/2018 | Hakeem | C04B 35/645 |

FOREIGN PATENT DOCUMENTS

| | | |
|---|---|---|
| EP | 3 210 955 A1 | 8/2017 |
| JP | 7-252581 A | 10/1995 |
| JP | 5245081 B2 | 4/2013 |

OTHER PUBLICATIONS

Abbas Saeed Hakeem, et al., "Development and processing of SiAlON nano-ceramics by Spark Plasma Sintering", Advances in Science and Technology, vol. 89, 2014, pp. 63-69.

Bilal Anjum Ahmed, et al., "Effect of precursor size on the structure and mechanical properties of calcium-stabilized sialon/cubic boron nitride nanocomposites", Journal of Alloys and Compounds, vol. 728, 2017, pp. 836-843.

B.A. Ahmed, et al., "Low-temperature spark plasma sintering of calcium stabilized alpha sialon using nano-size aluminum nitride precursor", International Journal of Refractory Metals and Hard Materials, Nov. 14, 2017, 4 pages (Abstract only).

Jianfeng Zhang, et al., "Preparation of SiAlON-cBN composites using Ni nanoparticle precipitated cBN powders", Key Engineering Materials, vol. 508, Mar. 27, 2010, pp. 17-20.

Abbas Saeed Hakeem, et al., "Sialon nano-composites matrix reinforced by cubic boron nitride prepared by using spark plasma sintering" International Conference and Exhibition on Materials Chemistry. vol. 5, Issue 2, (Suppl), Mar. 31-Apr. 1, 2016; p. 65.

Mikinori Hotta, "Microstructural control for ultrafine-grained non-oxide structural ceramics", Journal of the Ceramic Society of Japan, vol. 120, No. 4, 2012, pp. 123-130.

* cited by examiner

METHOD OF MAKING AN ALUMINA-SILICATE OXYNITRIDE AND CUBIC BORON NITRIDE CERAMIC COMPOSITE

CROSS REFERENCE TO RELATED APPLICATIONS

This application claims the benefit of priority from U.S. Provisional Application No. 62/430,578 filed on Dec. 6, 2016, which is incorporated herein by reference in its entirety.

STATEMENT OF ACKNOWLEDGEMENT

The authors wish to acknowledge King Abdul-Aziz City for Science and Technology (KACST) represented by the science and technology unit in King Fahd University for Petroleum and Minerals (KFUPM) for funding this work through the National Science, Technology and Innovation Plan (NSTIP) with a project No. 13-NAN1700-04.

BACKGROUND OF THE INVENTION

Technical Field

The present invention relates to a method for producing a composite of cubic boron nitride (cBN) dispersed in a SiAlON ceramic.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ceramics serve a traditional role as durable materials that are able to withstand extreme temperatures and pressures. One of the ceramics that exhibits outstanding thermo-mechanical resilience is silicon nitride [Riley, F. L. *J. Am. Ceram. Soc* 83 (2000) 245-65—incorporated herein by reference in its entirety]. However, the synthesis of fully compact and densified silicon nitride materials is challenging given the strong covalent character of its chemical bonds, which require excessively high temperatures to overcome [Hampshire, S. "The Role of Additives in the Pressureless Sintering of Nitrogen Ceramics for Engine Applications." *Metals Forum*. Pergamon Press 7 (1984) 162-70 and Hampshire, S. *Materials Science Forum* Trans Tech Publications 606 (2009) 27-41—each incorporated herein by reference in its entirety]. However, certain metal oxide additives to silicon nitride, combined with synthesis at high temperatures as well as sufficiently long sintering periods, have led to the development of fully compact materials at much lower temperatures [Riley, F. L. *J. Am. Ceram. Soc* 83 (2000) 245-65; Hampshire, S. "The Role of Additives in the Pressureless Sintering of Nitrogen Ceramics for Engine Applications." *Metals Forum*. Pergamon Press 7 (1984) 162-70; Hampshire, S. *Materials Science Forum* Trans Tech Publications 606 (2009) 27-41; and Hampshire, S. et al. "Grain Boundary Glasses in Silicon Nitride: A Review of Chemistry, Properties and Crystallisation." *J. Eur. Ceram. Soc* 32 (2012) 1925-32—each incorporated herein by reference in its entirety]. An obvious outcome of this additive modification was the development of sialon materials, which have an additive-controlled structure-property relationship [Jack, K. H. et al. *Nature* 238 (1972) 28-9; Oyama, Y. et al. *Jpn. J. Appl. Phys*. 10 (1971) 1637; and Hampshire, S, et al. *Nature* 274 (1978) 880-2—each incorporated herein by reference in its entirety].

Although rare-earth metal oxides have been employed as stabilizing additives in the sintering of sialons for decades, calcium oxide lately has become a favorable additive due to its higher solubility and stability [Herrmann, M. et al. *J. Eur. Ceram. Soc* 32 (2012) 1313-9; Menke, Y. et al., "Effect of Rare-Earth Cations on Properties of Sialon Glasses." *J. Non-Cryst. Solids* 276 (2000) 145-50; Bandyopadhyay, S. et al. *Ceram. Int*. 25 (1999): 207-13; Hakeem, A. S. et al. *J. Eur. Ceram. Soc* 27 (2007) 4773-81; Wang, P. L. et al. *Mater. Lett*. 38 (1999) 178-85; and Wang, P. L. et al. *J. Eur. Ceram. Soc* 20 (2000) 1333-7—each incorporated herein by reference in its entirety]. Moreover, the low cost and high availability of Ca-based compounds has been an additional advantage for their use as sintering aids [Van, R. et al. *Ceram. Int*. 27 (2001) 461-6—incorporated herein by reference in its entirety].

While the use of metal oxide additives has enabled the sintering of silicon nitride ceramics at less extreme temperatures, the advent of spark plasma sintering (SPS) has additionally provided a faster synthesis route than traditional sintering methods such as hot pressing and hot isostatic pressing [Belmonte, M. et al. *J. Eur. Ceram. Soc* 30 (2010) 2937-46—incorporated herein by reference in its entirety]. SPS is a consolidation technique that has gained attention for the synthesis of ceramic materials due to its higher heating rate, shorter synthesis duration, and novel pulsed-current based heating [Liu. L. et at *J. Eur. Ceram. Soc* 30 (2010) 2683-9 and Salmon, D. et al. *J Eur. Ceram. Soc* 27 (2007) 2541-7—each incorporated herein by reference in its entirety].

In view of the foregoing, one objective of the present invention is to provide a method for producing a composite of cubic boron nitride (cBN) dispersed in a sialon ceramic. Another objective is to provide a densified, e.g., fully densified, cBN-reinforced sialon composite produced at a sintering temperature of as low as 1500° C., which gives rise to mechanical properties having contradictory natures, i.e. high hardness along with medium to high fracture toughness.

BRIEF SUMMARY OF THE INVENTION

According to a first aspect, the present disclosure relates to a method for producing a composite of cubic boron nitride (cBN) dispersed in a SiAlON ceramic. This method involves mixing silicon nitride nanoparticles, aluminum nitride nanoparticles, silica nanoparticles, calcium oxide nanoparticles, and cubic boron nitride (cBN) microparticles to produce a mixture, and sintering the mixture to produce the composite.

In one embodiment, the mixing involves sonication.

In one embodiment, the mixing involves ball milling.

In one embodiment, the cBN microparticles have a largest linear dimension of 10-50 μm and are present in the mixture at a weight percentage of 5-40 wt %, relative to a total weight of the mixture.

In a further embodiment, the mixture comprises nickel, where the nickel is located on an exterior surface of the cBN microparticles.

In a further embodiment of the above, the cBN microparticles are coated with nickel and comprise 20-80 wt % nickel, based on a total weight of the cBN microparticles.

In another further embodiment of the above, the composite has a higher fracture toughness than an otherwise identical composite sintered from cBN microparticles that do not have nickel.

In one embodiment, the silicon nitride nanoparticles comprise $\alpha$-$Si_3N_4$.

In one embodiment, the aluminum nitride nanoparticles have a longest linear dimension of 30-120 nm.

In one embodiment, the aluminum nitride nanoparticles have a longest linear dimension of 30-70 nm.

In a further embodiment, the composite has a higher fracture toughness than an otherwise identical composite produced from other aluminum nitride nanoparticles having a longest linear dimension of 85-500 nm.

In a further embodiment, where the aluminum nitride nanoparticles have a longest linear dimension of 30-70 nm, at least 75 wt % of the SiAlON ceramic is in a $\beta$ phase, relative to a total weight of the SiAlON ceramic.

In a further embodiment, where the aluminum nitride nanoparticles have a longest linear dimension of 30-70 nm, the composite comprises boron nitride, and 40-95 wt % of the boron nitride relative to a total weight of the boron nitride is hexagonal boron nitride (hBN) as determined by XRD and/or Raman spectroscopy.

In one embodiment, the sintering is a spark plasma sintering process.

In one embodiment, the sintering is performed at a temperature ranging from 1400-1600° C.

In one embodiment, the sintering comprises heating the mixture at a rate ranging from 5-600° C./min.

In one embodiment, the sintering comprises heating the mixture at a rate ranging from 90-110° C./min.

In one embodiment, the sintering comprises applying a uniaxial pressure ranging from 30-80 MPa to the mixture.

In one embodiment, the composite has a Vickers hardness ($HV_{10}$) of 8-25 GPa.

In one embodiment, the composite has a fracture toughness of 5-13 MPa√m.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
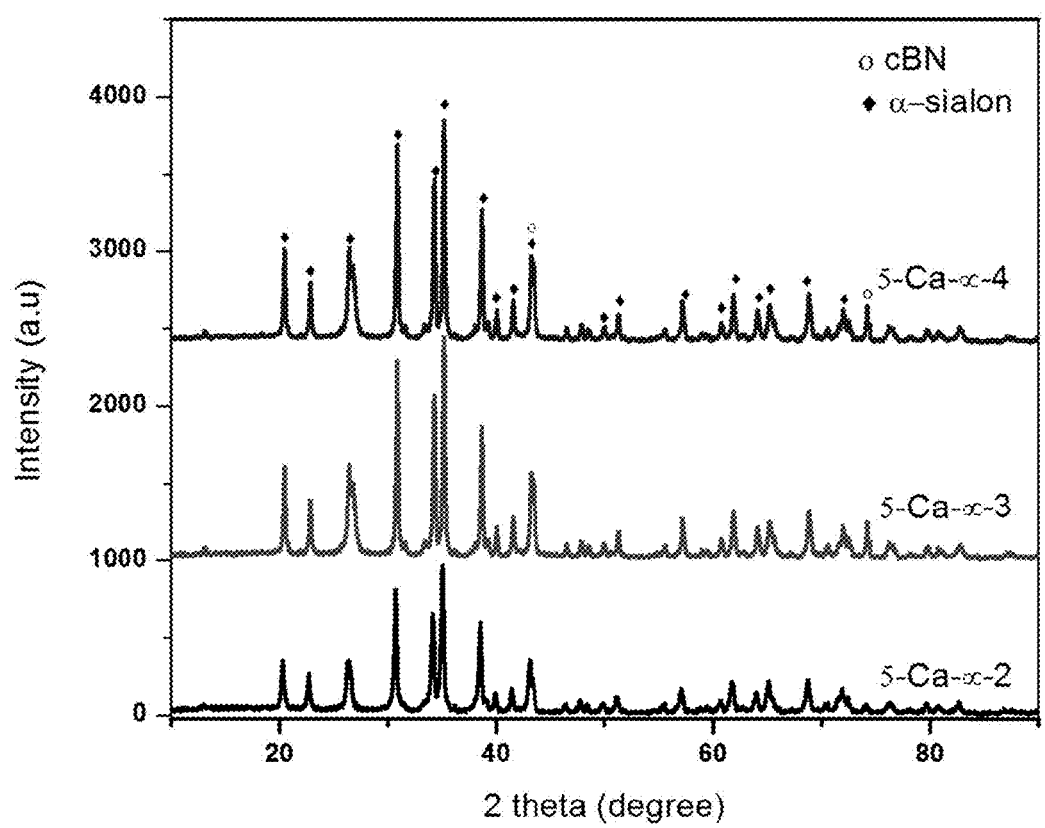
FIG. 1 shows X-ray diffraction (XRD) patterns of the sintered samples 5-Ca-$\alpha$-2, 5-Ca-$\alpha$-3, and 5-Ca-$\alpha$-4all of which comprise 20 μm cBN reinforcement and 100 nm AlN precursor.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

In addition, the present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

As defined here, a ceramic or a ceramic material is an inorganic, oxide, nitride, or carbide material. Ceramics are typically crystalline and non-metallic. Some elements, such as carbon or silicon, may be considered ceramics. However, some ceramics may contain metal ions, such as $Ca^{2+}$, interspersed within its structure. Ceramic materials are generally resistive against compression, but yield somewhat to shearing, fracturing, and tension, as compared to metals and metal alloys. Ceramics cats typically withstand chemical erosion that occurs in other materials subjected to acidic or caustic environments. Ceramics generally can withstand very high temperatures without degrading, such as temperatures that range from 1,000° C. to 1,600° C. Glass is not considered a ceramic because of its amorphous (noncrystalline) character. A "ceramic composite," or "ceramic matrix composite," refers to a composite where at least one of the constituent materials is a ceramic. Furthermore, "ceramic composite," is considered synonymous with "composite ceramic."

Sialons are ceramics based on their component elements silicon (Si), aluminum (Al), oxygen (O) and nitrogen (N), and also may be denoted as "SiAlON" or "SiAlONs." As ceramics, sialon materials comprise a solid solution of silicon nitride and alumina, and may be classified into multiple phases based on different empirical formula, crystal structures, microstructure, and thermo-mechanical properties. The most common phases are α-sialon ("alpha-sialon") and β-sialon ("beta-sialon"), however, other phases may be possible such as O-sialon or X-sialon. A single sialon material may have one phase or a mixture of more than one phase, such as a mixture of alpha and beta phases. Various types of sialon in both alpha and beta phases have been intensely studied during the past two decades due to their remarkable mechanical properties, specifically the high hardness in alpha-sialon and the modest fracture toughness in beta-sialon [Izhevskiy, V. A. et al. *J. Eur. Ceram. Soc* 20 (2000) 2275-95 and Ekstrom, T. et al. "SiAlON Ceramics." *J. Am. Ceram. Soc* 75 (1992) 259-76—each incorporated herein by reference in its entirety].

As defined here, alpha-sialon has the formula $M_x^v Si_{12-(m+n)} Al_{m+n})_n N_{16-n}$ where x<2 and x=m/v, where "M" is a non-aluminum metal. As evident from the formula, m represents the number of Al—N bonds, and n represents the number of Al—O bonds that together replace m+n Si—N bonds existing as four units of $Si_3N_4$ within the alpha-sialon unit cell [Jack, K. H. et al. *Nature* 238 (1972) 28-9; Hampshire, S, et al. *Nature* 274 (1978) 880-2; Cao, G. Z. et al. *Chem. Mater* 3 (1991) 242-52; and Jack, K. H. *J. Mater. Sci* 11 (1976): 1135-58—each incorporated herein by reference in its entirety]. The other major phase of sialon ceramics is beta-sialon, which is defined here as a sialon ceramic having a concurrent equimolar replacement of z units of silicon and nitrogen for 7 units of aluminum and oxygen and is generally defined by the formula $Si_{6-z} Al_z O_z N_{8-z}$. Here, z may range from more than 0 to less than 4.2. In a preferred embodiment, z may range from 1-4, more preferably 1-3. Unlike alpha-sialon, the beta-sialon structure does not include a non-aluminum metal.

In the formula for alpha-sialon, "M" may be a metal, other than aluminum, and is typically a lanthanide (for example, Nd, La, and Yb) or sortie other rare earth metal. Sialons typically include the identity of M in their name as in Yb-sialon, Yb-α-sialon, or Yb-α-SiAlON to denote that the ceramic comprises Yb as "M," and a sialon having an incorporated metal may be considered "toughened." The metal may be added as a sintering aid to improve ceramic densification using a lower energy input for sintering (i.e. lower sintering temperature and/or a shorter sintering time). However, lanthanides have large ionic radii and poorly occupy the interstitial sites of $Si_3N_4$, producing ceramics with crystal defects. In addition, introducing lanthanides or rare-earth metals into ceramics is cost-prohibitive. To address these issues, alkaline earth metals and/or oxides of alkaline earth metals may be used as sintering aids. Among these candidates, calcite oxide is promising because the calcium atom can reside in an α-SiAlON structure without distorting the crystal structure [Wang, P. L. et al. *Mater. Lett.* 38 (1999) 178-85 and Wang, P. L. et al. *J. Eur. Ceram. Soc* 20 (2000) 1333-7—each incorporated herein by reference in its entirety]. In other embodiments, "M" may be Ba, Eu, Sr, Ra, Mg, or Be, and may also be added to the mixture as an oxide. In alternative embodiments, an α-sialon may have more than one type of non-aluminum metal, for instance, Yb and Ca, having a Yb to Ca mass ratio of 1:1,000-1,000:1, preferably 1:100-100:1, more preferably 1:10-10:1.

With certain precursor sizes or conditions (such as heat and/or pressure), or in the presence of certain additives, sialons may transform from one phase to another, or may transform from a single phase to having two or more phases. For example, a portion of an α-sialon may transform into a β-sialon during sintering. In this transformation, the non-aluminum metal may migrate or leech out of the ceramic by the formation of a liquid phase, and the liquid phase may facilitate the other changes to the chemical and structural compositions. However, in some embodiments, the mixture may produce a liquid phase during the sintering while resulting in only a single phase α-sialon. In another embodiment, a sialon may transform into a non-sialon ceramic during sintering. In another embodiment, an α-sialon may transform into an α-sialon having a formula of the type $M_x^v Si_{12-(m+n)} Al_{m+n} O_n N_{16-n}$, but with a different value of m and/or n. Likewise, a β-sialon may transform into a β-sialon of the formula $Si_{6-z} Al_z O_z N_{8-z}$, but with a different value of z.

Another technique to achieve ceramic densification at a lower sintering temperature is to employ submicron-sized and/or nano-sized starting powders, and to use a reinforcing particle, such as cBN or nickel coated cBN. Such techniques will be described hereinafter.

According to a first aspect, the present disclosure relates to a method for producing a composite of cubic boron nitride (cBN) dispersed in a SiAlON ceramic. This method involves mixing silicon nitride nanoparticles, aluminum nitride nanoparticles, silica nanoparticles, calcium oxide nanoparticles, and cubic boron nitride (cBN) microparticles to produce a mixture, and sintering the mixture to produce the composite.

The silicon nitride nanoparticles, aluminum nitride nanoparticles, silica nanoparticles, calcium oxide nanoparticles, and cBN microparticles may be spheres, spheroids, ellipsoids, flakes, cubes, prisms, or irregular shapes with carved and/or flat surfaces, unless otherwise specified. In a preferred embodiment, the nanoparticles are spheres or substantially spherical, and the cBN microparticles are cubic, rectangular, tetragonal, or cuboid. As used herein, a diameter of a particle, including nanoparticles and microparticles, refers to the greatest possible distance measured from one point on the particle through the center of the particle to a point directly across from it. A diameter of a flake, as used herein, refers to the greatest possible distance measured from a first point on a perimeter of the flake through the center of the flake to a second point, also on the perimeter of the flake, directly across from the first point. The diameters of the particles are described hereinafter.

In one embodiment, the silicon nitride ($Si_3N_4$) nanoparticles may comprise one of α-$Si_3N_4$, β-$Si_3N_4$, γ-$Si_3N_4$, amorphous $Si_3N_4$, and mixtures thereof. In a preferred embodiment, the silicon nitride nanoparticles comprise α-$Si_3N_4$. The silicon nitride nanoparticles may have a diameter of 50-500 nm, preferably 100-400 nm, more preferably 250-350 nm, though in some embodiments the silicon nitride nanoparticles may have may have diameters less than 50 nm or greater than 500 nm. In another embodiment, the silicon nitride particles are amorphous and have a diameter ranging from 1-100 nm, preferably 10-50 nm, more preferably 10-30 nm. In one embodiment, a purity of the silicon nitride nanoparticles is more than 98 wt %, preferably more than 99 wt %, more preferablymore than 99.9 wt % relative to the total weight of the silicon nitride particles.

In one embodiment, the aluminum nitride (AlN) nanoparticles have a diameter or longest linear dimension of 30-120 nm, preferably 40-110 nm, more preferably 80-105 nm, or about 100 nm. In another embodiment, the aluminum nitride nanoparticles have a diameter or longest linear dimension of 30-70 nm, preferably 40-60 nm, more preferably 45-55 nm, or about 50 nm. However, in other embodiments, the aluminum nitride nanoparticles may have a diameter or longest linear dimension of less than 30 nm or greater than 120 nm, for instance, 120-500 nm. In one embodiment, a purity of the aluminum nitride nanoparticles is more than 98 wt %, preferably more than 99 wt %, more preferably more than 99.9 wt % relative to the total weight of the aluminum nitride particles.

In one embodiment, the silica ($SiO_2$) nanoparticles may have a diameter of 20-80 nm, preferably 25-55 nm, more preferably 35-45 nm, or about 40 nm. However, in some embodiments, the silica nanoparticles may have a diameter less than 20 nm or greater than 80 nm. In one embodiment, a purity of the silica nanoparticles is more than 98 wt %, preferably more than 99 wt %, more preferably more than 99.9 wt % relative to the total weight of the silica particles. The silica particles may be crystalline or amorphous.

In one embodiment, the calcium oxide (CaO) nanoparticles may have a diameter of 40-300 nm, preferably 100-180 nm, more preferably 155-165 nm, or about 160 nm. However, in some embodiments, the silica nanoparticles may have a diameter less than 40 nm or greater than 300 nm. In one embodiment, a purity of the calcium oxide nanoparticles is more than 98 wt %, preferably more than 99 wt %, more preferably more than 99.9 wt % relative to the total weight of the calcium oxide nanoparticles.

In one embodiment, the cBN microparticles may have a diameter or largest linear dimension of 10-50 μm, preferably 15-30 μm, more preferably 17-23 μm, or preferably 30-45 μm, more preferably 37-43 μm. However, in some embodiments, the cBN microparticles may have a diameter or largest dimension of less than 10 μm (for instance, as nanoparticles) or greater than 50 μm. In an alternative embodiment, microparticles of boron nitride comprising phases instead of or in addition to cubic boron nitride (cBN) may be used in the mixture. For instance, boron nitride may be in the form of amorphous boron nitride, hexagonal boron nitride (hBN), or rhombohedral (rBN) or Wurtzeit (wBN) boron nitride allotropes. Boron nitride may also be in the form of nanotubes. In one alternative embodiment, boron nitride in two or more of the mentioned forms may be used in the mixture.

In one embodiment, the cBN microparticles are present in the mixture at a weight percentage of 5-40 wt %, preferably 8-32 wt %, more preferably 8-12 wt %, or more preferably 18-22 wt %, or more preferably 28-32 wt %, relative to a total weight of the mixture. However, in some embodiments, the cBN microparticles may be present in the mixture at a weight percentage lower than 5 wt % or greater than 40 wt % relative to a total weight of the mixture. In one embodiment, the mixture comprises nickel, and the nickel is located on an exterior surface of the cBN microparticles or entirely covering individual cBN microparticles. The nickel may be in the form of nanoparticles having diameters of 20-500 nm, preferably 50-300 nm, more preferably 80-150 nm. In one embodiment, the cBN microparticles are coated with nickel (Ni) or have attached nanoparticles of nickel, and the nickel is present at a weight percent of 20-80 wt %, preferably 30-70 wt %, more preferably 35-65 wt % relative to a total weight of the cBN microparticles. However, in some embodiments, where the nickel is located on an exterior surface of the cBN microparticles or entirely covering individual cBN microparticles, the cBN microparticles may comprise less than 20 wt % or greater than 80 wt % nickel. In alternative embodiments, the cBN microparticles may be coated or in contact with different metals or compounds, for instance, Ti, TiN, Nm, Nb, Cr, V, W, Mo, and/or steel.

In one embodiment, the relative amounts of silicon nitride nanoparticles, aluminum nitride nanoparticles, silica nanoparticles, and calcium oxide nanoparticles may be chosen to satisfy the empirical formula $Ca_xSi_{12-(m+n)}Al_{m+n}O_nN_{16-n}$, where x<2 and x=m/2, which describes an Ca-alpha-sialon (Ca-α-sialon) ceramic.

In one embodiment, relative amounts of silicon nitride nanoparticles, aluminum nitride nanoparticles, silica nanoparticles, and calcium oxide nanoparticles may be mixed to provide a relative amount of Ca, Si, Al, O, and N having a weight percent composition of 4-7 wt % Ca, preferably 5-6 wt % Ca, or about 5.4 wt % Ca; 42-49 wt % Si, preferably 43-47 wt % Si, or about 43.6 wt % Si; 8-14 wt % Al, preferably 9-13 wt % Al, or about 12.75 wt % Al; 1-5 wt % O, preferably 1.5-4 wt % O, or about 3.2 wt % O; and 33-38 wt % N, preferably 34-37 wt % N, or about 35.0 wt % N, each relative to a total weight of Ca, Si, Al, O, and N. In alternative embodiments, other compounds comprising those elements such as metallic Al, $Al_2O_3$, or $CaO_3$ may be used to make a mixture having similar weight percentages of components.

However, in other embodiments, AlN may be the only source of aluminum in the mixture, meaning that other aluminum compounds such as aluminum metal and alumina are not added. Similarly, in one embodiment, CaO may be the only source of calcium in the mixture. In another related embodiment, $Si_3N_4$ may be the only source of Si, meaning that only CaO, $Si_3N_4$, AlN, and $Al_2O_3$ may be added to the mixture, as $SiO_2$ is not needed. Other combinations for the mixture may be possible, and may be determined by a person having ordinary skill the art. In other alternative embodiments, a compound may be added to the mixture that comprises an additional element, such as carbon in the case of adding $CaCO_3$, and the additional element may escape or leach out during the process of making the composite, for instance, during the sintering step.

In one embodiment, the relative amounts of the nanoparticles are chosen to satisfy the empirical formula $Ca_aSi_bAl_cO_dN_e$, where a is 0.6-0.9, preferably 0.75-0.85; where b is 9.1-10.0, preferably 9.15-9.25; where c is 2.0-2.9, preferably 2.75-2.85; where d is 0.6-1.3, preferably 1.15-1.25; and where e is 14.7-15.4, preferably 14.75-14.85. In a preferred embodiment, the relative amounts of the nanoparticles are chosen to satisfy the empirical formula $Ca_{0.8}Si_{9.2}Al_{2.8}O_{1.2}N_{14.8}$ or an empirical formula having approximately similar relative amounts, which is an empirical formula for a single phase Ca-alpha-sialon ceramic, where m=1.6 and n=1.2. In other embodiments, a single phase Ca-alpha-sialon empirical formula may be pursued in which m is 0-3 (with n>0), preferably 0.5-2.0, more preferably 1.5-1.8, and n is 0-4.2 (with n>0), preferably 0.5-3.0, more preferably 0.8-2.0, even more preferably 1.0-1.4, and in certain alternative embodiments, m may be greater than 3, and/or n may be greater than 4.2. In one embodiment, the empirical formula determined from a composite may be slightly different than the empirical formula of the mixture before the sintering. Of a formed composite, weight percentages or empirical formula of Ca, Si, Al, O, and N may be determined by atomic absorption spectroscopy, energy dispersive X-ray spectroscopy, a carrier-gas-heat-extraction method, or some other technique.

In one embodiment, a total mass of the mixture may be 1-100 g, preferably 2-50 g, more preferably 3-10 g, or about 5 g. Depending on use, some embodiments may use a total mass of the mixture that is greater than 100 g, for example, in a pilot plant or in an industrial scale chemical plant.

In one embodiment, the mixing of the mixture components (silicon nitride nanoparticles, aluminum nitride nanoparticles, silica nanoparticles, calcium oxide nanoparticles, and cBN microparticles) involves sonication. In a preferred embodiment, the powders are dispersed in a sufficient amount of an organic solvent, preferably volatile at room temperature, to form a slurry which is sonicated for 10-60 minutes, preferably 25-35 minutes. The sonication may be applied by inserting an ultrasonic probe into the slurry or by placing a container of the slurry into a sonication bath. The sonication may be pulsed or continuous. Non-limiting examples of the organic solvent include hydrocarbons, such as hexane, alcohols, such as ethanol, methanol, propanol, isopropanol, butanol, ketones and esters. Preferably, the solvent is an alcohol. More preferably, the alcohol has a melting point lower than 0° C. and a boiling point lower than 100° C. In a preferred embodiment, the alcohol is ethanol. The organic solvent may act as a viscosity modifying agent, providing a suitable viscosity for handling the slurry and accomplishing the mixing. In addition, the solvent may have a viscosity ranging from 0.5-2 cP, preferably 0.5-1.5 cP, more preferably 0.5-1.2 cP. Any amount of liquid that accomplishes the mixing is acceptable. Preferably, the solids content is between 15-50 vol %, preferably 15-35 vol %, more preferably 20-30 vol % of the total volume of the slurry. Below this limit, mixing may be ineffective or separation by settling may occur, although a solid content below this limit may still be used depending on the particle size, solvent, and mixing procedure. Above the limit, in some instances, the viscosity may be too high and mixing and de-agglomeration may not be effective. The volatile organic solvent may evaporate during sonication, leaving no residue. Preferably, after the sonication, the slurry is heated to 60-120° C., preferably 70-90° C. for 1-24 hours, preferably 8-24 hours, more preferably 10-24 hours to remove the solvent completely. In one embodiment, the sonication may break up particles and decrease particle sizes by 10-90%, preferably 20-70%, relative to a particle size before the sonicating. However, in some embodiments, the particle size distribution may not change substantially before and after the sonicating.

In one embodiment, the mixing of the mixture components involves ball milling, or high energy ball milling. The mixture components may be milled with a miller, such as a planetary miller, an attrition mill, a vibratory mill or a high energy miller. Non-limiting examples of milling media (i.e. bowl and balls) include zirconium dioxide, tungsten carbide, silicon nitride, and alumina. In one embodiment, silicon nitride milling media is employed to minimize contamination of the powder mixture. The balls used for milling may have a diameter of 200-1,000 µm, preferably 300-900 µm, more preferably 400-800 µm, even more preferably 600-650 µm, though balls with diameters smaller than 200 µm or greater than 1,000 µm may be used. In one embodiment, a weight ratio of the balls to the powder mixture ranges from 4:1 to 35:1, preferably from 5:1 to 30:1, more preferably from 10:1 to 25:1. A process control agent, such as stearic acid or ethanol, may be added to the powder mixture to ensure the powder mixture does not cake. Preferably ethanol is used. An amount of the process control agent ranges from more than 0 wt % to 2 wt %, preferably 0.5-1.5 wt %, more preferably 0.5-1 wt % of the weight of the powder mixture.

In a preferred embodiment, no process control agent is employed. In one embodiment, the milling is performed in an inert atmosphere, preferably provided by argon gas, though in another embodiment, the milling may be performed in air. The powder mixture may be milled for up to 10 hours, or up to 5 hours, or up to 2 hours, preferably for 10-90 minutes, preferably for 45-75 minutes. A high-energy ball milling apparatus may use a rotation rate of 2,000-10,000 rpm, preferably 2,500-5,000 rpm, more preferably 2,750-3,250 rpm. Preferably, the ball milling decreases the size of the particles by 30-95%, preferably 40-90%, more preferably 60-90% relative to a size of the particles before the ball milling. In one embodiment, ball milling in air may lead to slight chemical changes of the mixture components. For instance, a portion of ball milled CaO may react with air to form $CaCO_3$.

In one embodiment, the mixture components may be mixed incrementally, for instance, the nanoparticles may be mixed first by sonication, and then cBN microparticles may be added and then the mixture further sonicated, in order to not substantially decrease the size of the cBN microparticles. Alternatively, the nanoparticles may be ball milled, and then cBN added and mixed by sonication. In an alternative embodiment, the nanoparticles and cBN microparticles may be mixed by a mortar and pestle, or by other means, such as a blade grinder or burr grinder. Changes in particle sizes before and after the mixing may be measured by field emission scanning electron microscopy (FESEM), dynamic light scattering, or other techniques.

The sintering process may be hot pressing, hot isostatic pressure, pressureless sintering, or spark plasma sintering. In one embodiment, the sintering is a spark plasma sintering process. Spark plasma sintering may be preferred over the other sintering processes because spark plasma sintering densifies the compacted powders more quickly and at relatively low temperatures. Thus, the formation of secondary phases with different properties may be controlled. For instance, changes in the sintering conditions (pressure, time, temperature, heating rate, cooling rate, starting particle size) may affect the weight ratio of the α-sialon and β-sialon phases that result in the ceramic composite.

For the sintering process, the mixture may be transferred to a die with a diameter of 10-50 mm, preferably 15-35 mm, mare preferably 15-25 mm. The die may comprise graphite. The powder mixture may be compacted into the die at ambient temperature, or while heating or sintering. The compacted powder mixture may be in the form of a disc having a similar diameter as the graphite die, and a thickness of 1-40 mm, preferably 2-15 mm, more preferably 3-10 mm. However, in other embodiments, the compacted powder mixture may be in other forms, such as a rectangular prism, depending on the shape of the die. In a preferred embodiment, a uniaxial pressure is applied to the die in a direction that is normal to the ground. In one embodiment, the sintering comprises applying a uniaxial pressure to the powder mixture, where the uniaxial pressure may be 30-80 MPa, preferably 35-70 MPa, more preferably 40-60 MPa, even more preferably 45-55 MPa. However, in other embodiments, pressures lower than 30 MPa or greater than 80 MPa may be used successfully.

In one embodiment, the sintering comprises heating the mixture at a rate ranging from 5-600° C./min, preferably 120-500° C./min, more preferably 200-400° C./min. In another embodiment, the sintering comprises heating the mixture at a rate ranging from 90-110° C./min, preferably 95-105° C./min, or about 100° C./min. However, in other embodiments, heating rates of lower than 5° C./min or greater than 600° C./min may be used successfully. The heating may comprise one or more heating steps. In a preferred embodiment, the heating consists of only one heating step.

In one embodiment, the sintering is performed at a temperature ranging from 1400-1600° C., preferably 1420-1550° C., more preferably 1450-1520° C., even more preferably about 1500° C., or in one embodiment, no greater than 1500° C.

In a spark plasma sintering process, composite starts to cool down once the current is switched off. The cooling of the composite may be controlled and/or accelerated with a pre-set program. In a preferred embodiment, the composite is cooled down at a rate ranging from 1-20° C./s, preferably 1-10° C./s, more preferably 2-5° C./s. The composite may be cooled by a flow of an inert gas, such as nitrogen or argon. The composite may be cooled to a temperature ranging from 20-40° C., preferably 20-30° C., more preferably 20-25° C. In one embodiment, the composite may be cooled down to 20-30° C. within 15 minutes, preferably within 12 minutes, even more preferably within 10 minutes. The composite may be cleaned to remove graphite or other contaminants from the die or sintering apparatus, and the composite may be cut or polished.

As noted earlier, the first aspect of the present disclosure relates to a method of producing a composite of cubic boron nitride (cBN) dispersed in a sialon ceramic. In one embodiment, the sialon consists of only the α-sialon phase. In another embodiment, the sialon consists of only the β-sialon phase. However, in another embodiment, the sialon ceramic of the composite comprises both α and β phases. For instance, a weight ratio of the α phase to the β phase may be 1:1,000-1,000:1, preferably 1:100-100:1, more preferably 1:50-50:1, even more preferably 1:10-10:1, though in some embodiments, a weight ratio of the α phase to the β phase may be smaller than 1:1,000 or larger than 1,000:1. In one embodiment, the weight ratio of the phases may be estimated by comparing the peak area ratio of the corresponding XRD patterns. In an alternative embodiment, the composite may comprise a sialon ceramic in a crystal phase other than α and β phases, or a part of the sialon ceramic may be amorphous. A portion, or all of the β phase may be β-$Si_{10}Al_2O_2N_{14}$, which may also be written as β-$Si_5AlON_7$, where z=1 as in the previously presented chemical formula.

Figure 5A:
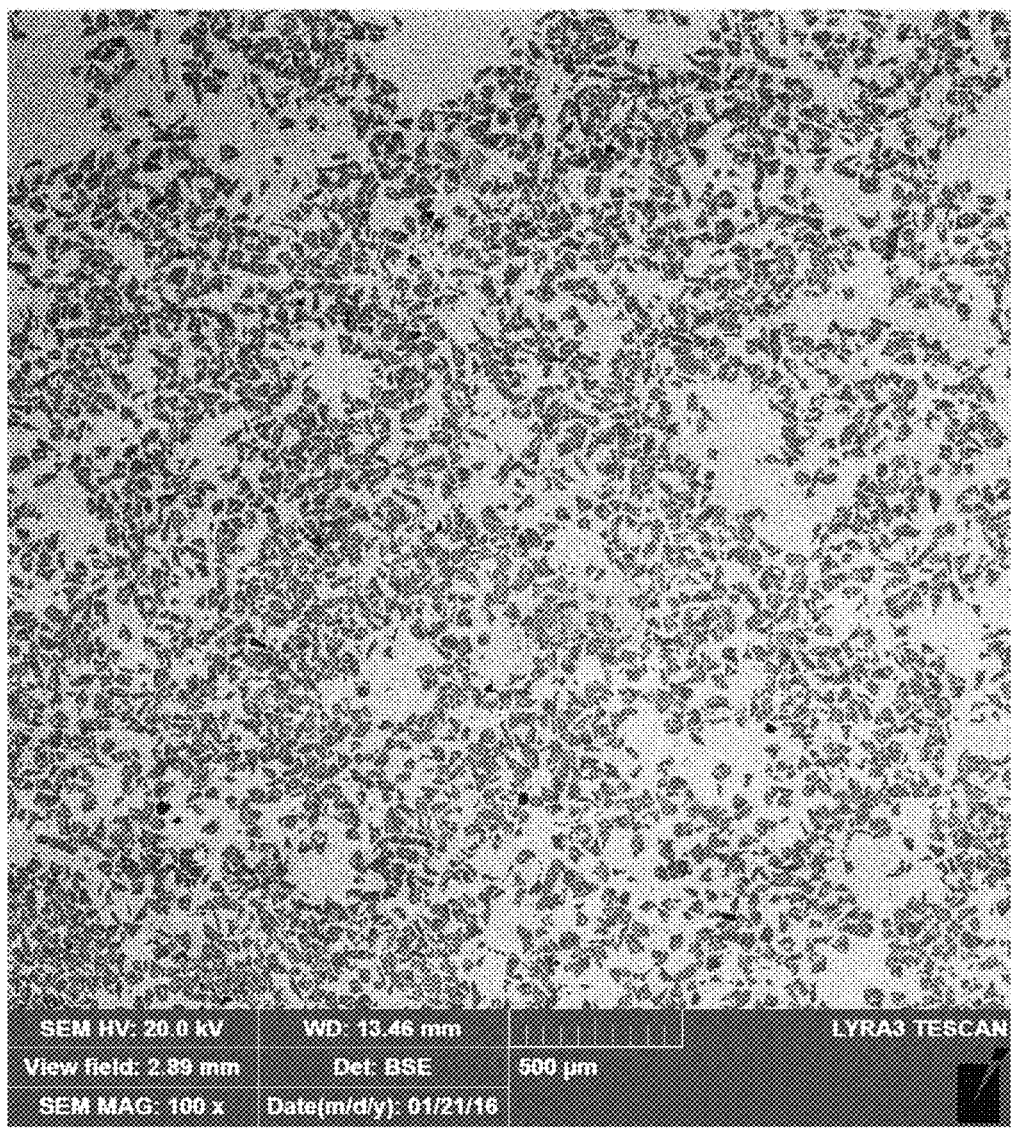
FIG. 5A is a FESEM micrograph of a polished surface of the 5-Ca-$\alpha$-7 composite.

In a preferred embodiment, the ceramic composite also comprises cBN, which is dispersed within the sialon ceramic. In one embodiment, the cBN may be in the form of microparticles, which may have diameters as described previously for the cBN microparticles. In another embodiment, the cBN in the composite may have nickel on the cBN or coating the cBN as previously described. However, in another embodiment, the sintering or mixing may change the size or shape of the cBN. For instance, the diameter of the cBN particles may decrease by 2-80%, preferably 10-70% relative to their original diameter, however, in an alternative embodiment, the diameter may increase if two or more cBN particles contact each other and fuse together during the sintering. Similarly, the shape or size of the nickel on a cBN particle may change during the sintering. FIG. 5A shows an FESEM image of a composite with cBN particles (black) dispersed within.

In one embodiment, the composite comprises hBN, and this may be produced by cBN being converted to hBN during the sintering process. For ceramic composites containing boron nitride (BN) as a constituent material or reinforcement, the conversion of cBN to hBN in a ceramic composite may lower hardness, lower density, increase porosity, and/or promote cracking of a composite. In one embodiment, the composite only consists of boron nitride in the form of cBN. In an alternative embodiment, the composite only consists of boron nitride in the form of hBN. In another embodiment, the ceramic comprises boron nitride in the form of both cBN and hBN. For instance, a weight ratio of cBN to hBN phase may be 1:1,000-1,000:1, preferably 1:100-100:1, more preferably 1:50-50:1, even more preferably 1:10-10:1, though in some embodiments, a weight ratio of cBN to hBN may be smaller than 1:1,000 or larger than 1,000:1. In one embodiment, the weight ratio of cBN to hBN may be estimated by comparing the peak area ratio of the corresponding XRD patterns. The presence of a phase may also be studied by Raman microscopy. In an alternative embodiment, the composite may comprise boron nitride in a crystal phase other than cBN and hBN, or the boron nitride may be amorphous.

In one embodiment, the composite does not have pores. However, in an alternative embodiment, the composite may have micropores and/or submicron pores. The size of the micropores may range from 1-5 μm, preferably 1-4 μm, more preferably 1-3 μm. The size of the submicron pores may range from 50-400 nm, preferably 100-300 nm, more preferably 100-250 nm. In this alternative embodiment, where the composite has pores, the porosity of the composite is at most 20%, preferably at most 15%, preferably at most 5%, and more preferably at most 1%.

In one embodiment, the composite has a Vickers hardness, $HV_{10}$, (ASTM E384 Knoop and Vickers Hardness Testing) of 8-25 GPa, preferably 12-25 GPa, more preferably 20-25 GPa, or preferably 8-18 GPa, more preferably 10-16 GPa. However, in some embodiments, the composite may have a Vickers hardness of less than 8 GPa or greater than 25 GPa. Here, the Vickers hardness is measured under a load of 98 N (10 kg).

In one embodiment, the composite has a fracture toughness of 5-13 MPa√m, preferably 6-11 MPa√m, more preferably 6-10 MPa√m, or preferably 10-13 MPa√m, more preferably 11-13 MPa√m. However, in some embodiments, the composite may have a fracture toughness of less than 5 MPa√m or greater than 13 MPa√m. The unit MPa√m may also be written as MPa·$m^{1/2}$. The fracture toughness may be determined by the indentation method or some other technique.

In one embodiment, the composite may have a density of 2.0-4.0 g/$cm^3$, preferably 2.5-3.8 g/$cm^3$, more preferably 2.7-3.4 g/$cm^3$. In one embodiment, the composite may have a density of 3.35-3.45 g/$cm^3$ or 2.75-3.05 g/$cm^3$. However, in some embodiments, the composite may have a density of less than 2.0 g/$cm^3$ or greater than 4.0 g/$cm^3$. The density may be measured based on Archimedes' method with deionized water as the immersion medium, using density determination equipment. The relative density of the composite may be measured with respect to a reference sintered sialon ceramic, such as an otherwise similar sintered sialon made without cBN reinforcement, or to an otherwise similar composite made without nickel-coated cBN reinforcement, or to an otherwise similar composite that is conventionally sintered without spark plasma sintering.

Figure 5B:
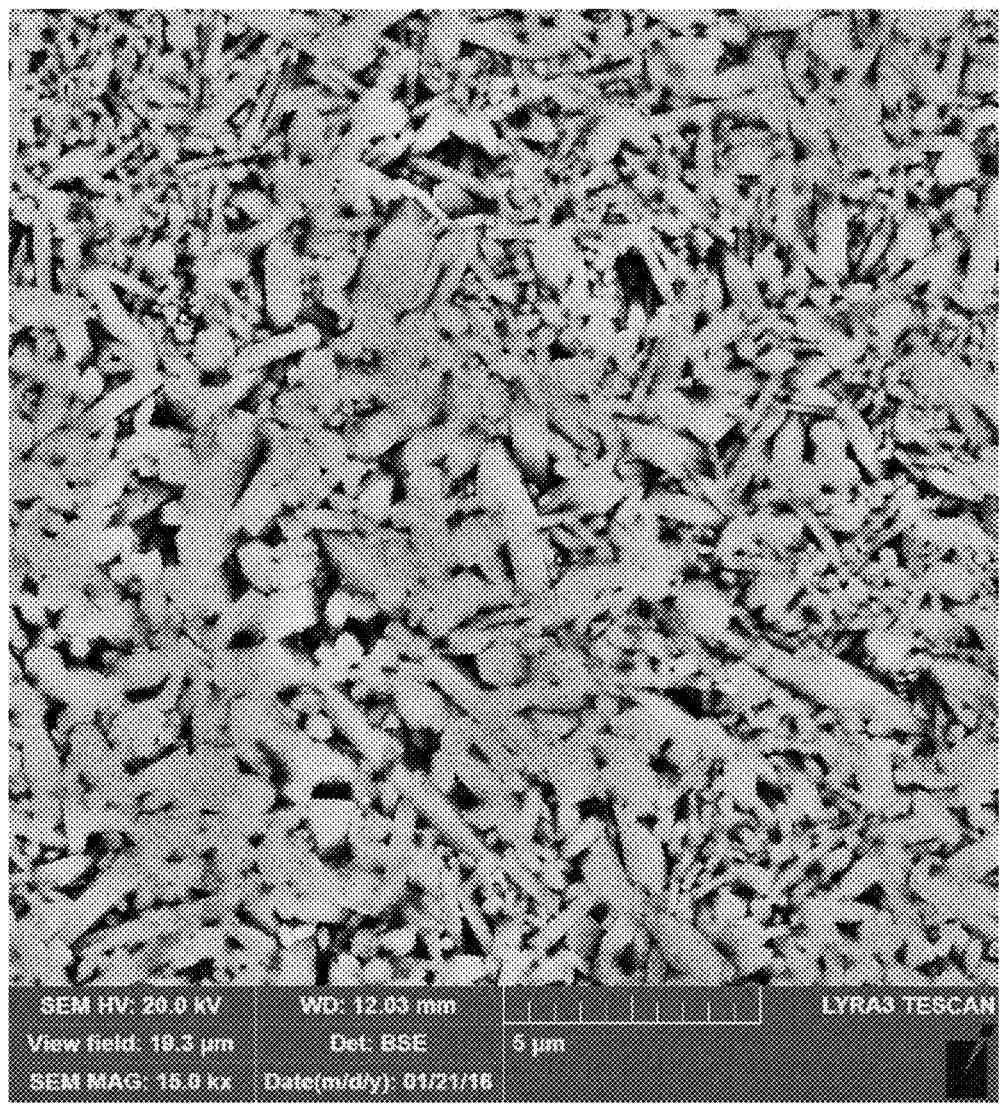
FIG. 5B is a FESEM micrograph of an etched surface of the 5-Ca-$\alpha$-7 composite.

In one embodiment, the grain size of the composite may be studied, for instance, by field emission scanning electron microscopy (FESEM), or, more generally scanning electron microscopy (SEM). A composite being studied by FESEM may first be polished or etched. Where the composite comprises both α and β-sialon ceramic, either or both phases may appear as elongated grains, needle-like grains, flake-like grains, and/or equiaxed grains. Preferably, the β-sialon phase is in the font of elongated grains, needle-like grains, and/or flake-like grains, and an embodiment of this is shown in FIG. 5B. The elongated grains may have a height ranging from 1-20 µm, preferably 1-15 µm, more preferably 1-10 µm, and a width ranging from 0.1-4 µm, preferably 0.5-3 µm, more preferably 0.5-2 µm. The aspect ratio (height divided by width) of the elongated grains may range from 2-200, preferably 10-150, more preferably 10-100. The needle-like grains may have a length ranging from 1-20 µm, preferably 1-15 µm, more preferably 1-10 µm. The flake-like grains may have a diameter of 1-15 µm, preferably 5-15 µm, more preferably 7-10 µm. Preferably the α-sialon ceramic is in the form of equiaxed grains. The equiaxed grains may have a diameter ranging from 100-1,000 nm, preferably 200-600 nm, more preferably 300-500 nm.

In one embodiment, the ratio of constituent phases in the composite (in particular, the weight ratio of the α-sialon to the β-sialon phase, and/or the weight ratio of cBN to hBN) may be dependent on different parameters of the method. In an additional embodiment, other physical characteristics of the composite may depend on different parameters of the method. Such physical characteristics include, but are not limited to, hardness, density, grain size/shape, porosity, dispersion of constituent compounds, and fracture toughness. These influencing method parameters include, but are not limited to, weight percent compositions, particle size, mixing method, type of sintering, sintering conditions (heating rate, atmosphere, pressure, time, temperature, cooling rate, sample mass, etc.), and the addition of additives.

In one embodiment, the wt % of cBN microparticles initially added to the mixture before the sintering, relative to a total weight of the mixture, may influence the weight ratio of α-sialon and β-sialon phases in the composite. For instance, increasing the wt % of cBN from 0 to 10 wt %, from 10 to 30 wt %, or from 0 to 30 wt % may increase the β-sialon phase by 20-95 wt %, preferably 30-92 wt %, even more preferably 50-90 wt % relative to a total mass of the sialon ceramic.

In one embodiment, the wt % of cBN microparticles initially added to the mixture before the sintering, relative to a total weight of the mixture, may influence the Vickers hardness in the composite. For instance, increasing the wt % of cBN from 0 to 10 wt %, from 10 to 30 wt %, or from 0 to 30 wt % may increase the Vickers hardness by 1-30%, preferably 2-20%, relative to an initial value of the Vickers hardness. Alternatively, increasing the wt % of cBN as described previously may instead decrease the Vickers hardness by 10-70%, preferably 15-65%, even more preferably 20-60% relative to an initial Vickers hardness.

In one embodiment, the wt % of cBN microparticles initially added to the mixture before the sintering, relative to a total weight of the mixture, may influence the fracture toughness in the composite. For instance, increasing the wt % of cBN from 0 to 10 wt %, from 10 to 30 wt %, or from 0 to 30 wt % may increase the fracture toughness by 1-30%, preferably 2-20%, relative to an initial value of the fracture toughness. Alternatively, increasing the wt % of cBN as described previously may decrease the fracture toughness by 10-70%, preferably 15-65%, even more preferably 20-60% relative to an initial fracture toughness.

In one embodiment, the presence of nickel on an exterior surface of cBN microparticles initially added to the mixture before the sintering may influence the fracture toughness of the sintered composite. In one embodiment, the composite has a higher fracture toughness than an otherwise identical composite sintered from cBN microparticles that do not have nickel. In one embodiment, the presence of nickel may show an increase of fracture toughness that is at least 5% greater, preferably at least 10% greater, more preferably at least 20% greater relative town otherwise identical composite that does not comprise nickel. While not being bound to any particular explanation br theory, the composite produced from cBN with nickel may lead to a greater fracture toughness due to smoother interface between the reinforcement and the sialon matrix.

In one embodiment, the presence of nickel on the cBN microparticles initially added to the mixture before the sintering may influence a weight ratio of α-sialon and β-sialon phases in the composite, as compared to an otherwise identical composite sintered from cBN microparticles that do not have nickel. For instance, the weight ratio of α-sialon and β-sialon phases may decrease when nickel is added to the cBN microparticles, meaning that the nickel leads to relatively more β-sialon.

In one embodiment, the particle size of AlN (aluminum nitride) used in the mixture may influence the fracture toughness, the Vickers hardness, the weight ratio of α-sialon to β-sialon phases, and the weight ratio of cBN to hBN. The degree of these changes may be similar to what was described above for changing different properties of the cBN microparticles used in the mixture. In other embodiments, the particle size of the other nanoparticle precursors, such as CaO, may similarly influence the properties and phase ratios of the composite. In one embodiment, the particle size of all nanoparticle precursors may be reduced, for instance, by ball milling, in order to produce composites with different properties.

In one embodiment, where the aluminum nitride nanoparticles have a longest linear dimension of 30-70 nm, preferably 40-60 nm, the composite has a higher fracture toughness than an otherwise identical composite produced from other aluminum nitride nanoparticles having a longest linear dimension of 85-500 nm, preferably 90-400 nm. In one embodiment, the fracture toughness of a composite made from the smaller aluminum nitride nanoparticles (30-70 nm diameter) may be increased 20-300%, preferably 30-200%, more preferably 35-150% relative to the fraction toughness of an otherwise identical composite made from the larger aluminum nitride nanoparticles (85-500 nm).

In a related embodiment, where the aluminum nitride nanoparticles have a longest linear dimension of 30-70 nm, preferably 40-60 nm, the composite has a lower Vickers hardness than an otherwise identical composite produced from other aluminum nitride nanoparticles having a longest linear dimension of 85-500 nm, preferably 90-400 nm. For instance, the Vickers hardness of a composite made from the smaller aluminum nitride nanoparticles may be decreased 5-80%, preferably 10-70%, more preferably 15-65% relative to the Vickers hardness of an otherwise identical composite made from the larger aluminum nitride nanoparticles.

In one embodiment, where the aluminum nitride nanoparticles have a longest linear dimension of 30-70 nm preferably 40-60 nm, at least 75 wt %, preferably at least 85 wt %, more preferably at least 95 wt % of the SiAlON ceramic is in a β phase, relative to a total weight of the SiAlON ceramic. While not being bound to any particular explanation or theory, it may be that the smaller particle size of the AlN precursor (30-70 nm vs. 80-500 nm), and thus higher surface area, facilitated the transformation of alpha-sialon into beta-sialon at sintering temperatures of 1400-1600° C., preferably 1450-1550° C. This higher surface area of AlN nanoparticles may enable a higher reactivity in creating a larger amount of oxygen-rich liquid during the sintering, leading to the transformation of α-sialon to β-sialon.

In another embodiment, where the aluminum nitride nanoparticles used in the mixture have a longest linear dimension of 30-70 nm, preferably 40-60 nm; 40-95 wt %, preferably 45-93 wt %, more preferably 50-90 wt % of the boron nitride relative to a total weight of the boron nitride in the composite is hexagonal boron nitride (hBN). This amount of the hBN phase may be determined by XRD and/or Raman spectroscopy. However, in some embodiments, lower than 40 wt % or greater than 95 wt % of the boron nitride is hBN. In one embodiment, substantially all of the boron nitride (i.e, 99.9 wt % boron nitride or greater) is hBN.

In a related embodiment, where the aluminum nitride nanoparticles used in the mixture have a longest linear dimension of 80-500 nm, preferably 90-400 nm; 0-60 wt %, preferably 0.1-30 wt %, more preferably 0.2-20 wt % of the boron nitride relative to a total weight of the boron nitride in the composite is hexagonal boron nitride (hBN).

In one embodiment, a material may comprise the composite. The material may be a part of an abrasive, a tool, a vehicular part, an aerospace component, an engine component, a turbine component, a break-ring, a nozzle, a reactor component, a high temperature refractory shape, a glass forming tool, a mold, a die, a refractory for metal forming, a furnace vent, a stack, or a fixture.

The examples below are intended to further illustrate protocols for preparing, and characterizing the composite of cubic boron nitride (cBN) dispersed in a SiAlON ceramic, and uses thereof, and are not intended to limit the scope of the claims.

EXAMPLE 1

Experimental Procedure

Single-phase alpha sialon and other compositions of alpha (α) and beta (β) alumina silicate oxynitride samples were synthesized, with a ratio of precursors to produce the general formula of $Ca_{0.8}Si_{9.2}Al_{2.8}O_{1.2}N_{14.8}$. The m and n values corresponding to the single phase alpha sialon region were selected as m=1.6 and n=1.2. The precursors employed for synthesis include alpha-$Si_3N_4$ (250-350 nm, Ube Industries SN-10, Japan), AlN (Sigma Aldrich, Germany). $SiO_2$ (40 nm, Sigma Aldrich, Germany), and CaO (160 nm, Sigma Aldrich, Germany). The classification of the sialon composites based upon the size of precursor as well as the size and weight percent of reinforcement (cBN) employed is summarized in Table 1.

Powder precursors satisfying the aforementioned general formula of alpha-sialon were carefully weighed to form 5 g samples. The initial powders along with the respective weight percent of reinforcements were mixed in an ultrasonic probe sonicator for 30 min, utilizing ethanol as a sonicating medium.

Some powder precursors were ball milled. High-energy ball milling was carried out in a Union Process model HDMM using 625 micron zirconium dioxide ($ZrO_2$) balls. The HEBM process was performed in ethanol media in air where the machine was operated at 3000 rpm for one hour with a powder to balls ratio of 1:20

Later on, the mixtures were oven dried at 80° C. for 12 h to evaporate the ethanol. The aforesaid sonicated powder mixtures were sintered into 20 mm discs at 1500° C. with a holding time of 30 minutes, while employing a constant pressure of 50 MPa. The heating rate use for the synthesis process was 100° C./min. Samples were then rapidly cooled down to ambient temperature within a timeframe of 10 min.

The sintered samples were then cleaned to remove graphite, mounted, ground, and polished using diamond discs according to standard metallography procedure. For identification of phases present in the synthesized samples, Rigaku MiniFlex X-ray diffractometer (Japan) was used with Cu $K_{\alpha 1}$ radiation (γ=0.15416 nm), a tube current of 10 mA, and an accelerating voltage of 30 kV. Microstructural studies were performed using a field emission scanning electron microscope (FESEM, Lyra 3, Tescan, Czech Republic) with accelerating voltages of 20-30 kV. Archimedes' principle was applied to evaluate the density of the sintered samples. A universal hardness tester (Zwick-Roell, ZHU250, Germany) was employed to evaluate the Vickers hardness of sintered samples under a load of 100 N. The fracture toughness was evaluated based on the indentation method.

TABLE 1

Classification of composites as per the particle size, reinforcement (cBN) weight percent, and AlN particle size.

| Sample ID | cBN Particle Size | cBN Wt. % | AlN Precursor Size (nm) | Coating |
|---|---|---|---|---|
| 5-Ca-α-1 | — | — | — | No |
| 5-Ca-α-2 | 20 μm | 10% | 100 | No |
| 5-Ca-α-3 | 20 μm | 20% | 100 | No |
| 5-Ca-α-4 | 20 μm | 30% | 100 | No |
| 5-Ca-α-5 | 40 μm | 10% | 50 | No |
| 5-Ca-α-6 | 40 μm | 20% | 50 | No |
| 5-Ca-α-7 | 40 μm | 30% | 50 | No |
| 5-Ca-α-8 | 40 μm | 10% | 50 | Nickel Coated cBN |
| 5-Ca-α-9 | 40 μm | 20% | 50 | Nickel Coated cBN |
| 5-Ca-α-10 | 40 μm | 30% | 50 | Nickel Coated cBN |

EXAMPLE 2

Results and Discussion—Phase Assemblage

Figure 2:
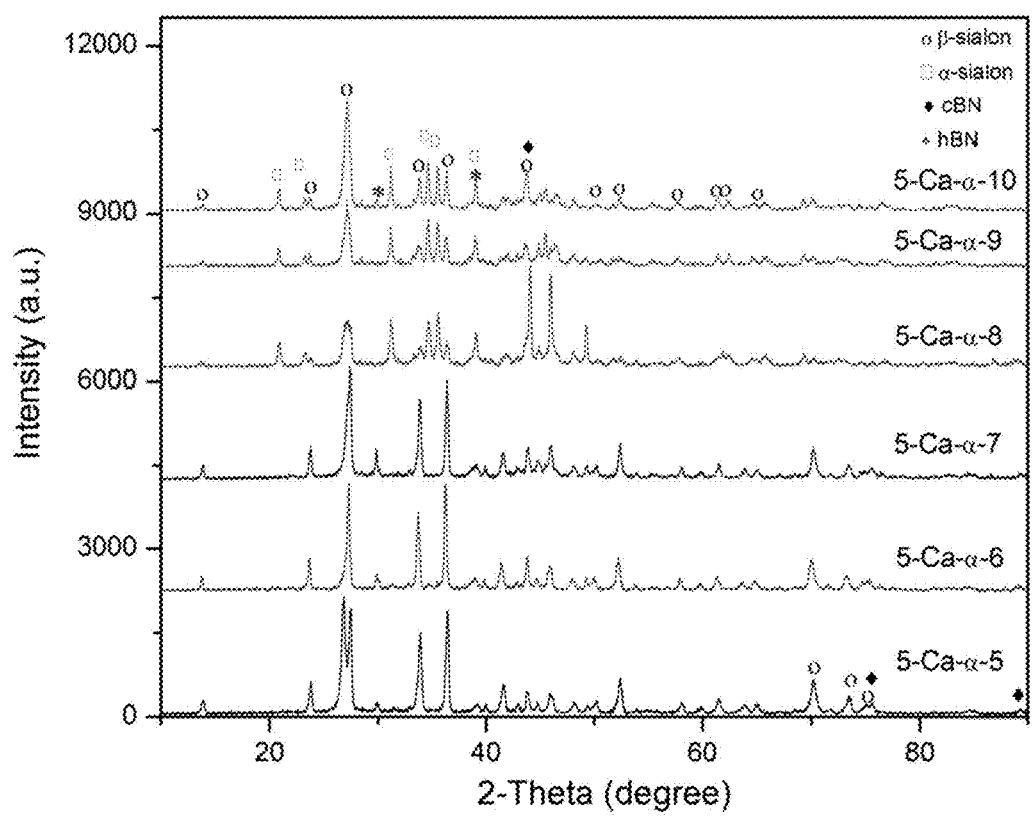
FIG. 2 shows XRD patterns of samples 5-Ca-$\alpha$-5 to 5-Ca-$\alpha$-10, all of which comprise 40 μm cBN reinforcement and 50 nm AlN precursor.

X-ray diffraction patterns of the sintered samples 5-Ca-α-2, 5-Ca-α-3, and 5-Ca-α-4 each having 10, 20, and 30 weight percent of 20 μm cBN, respectively, are shown in FIG. 1. These samples were sintered at 1500° C. and a holding time of 30 min. Sialon and cBN (20 μm) were matched with ICDD #00-042-0252 and 01-089-1498, respectively. For the samples synthesized with the aid of 40 μm cBN reinforcement (5-Ca-α-5 to 5-Ca-α-10), diffraction patterns are shown in FIG. 2. These samples were also sintered at 1500° C. and with a holding time of 30 min. Sialon and cBN (40 μm) were matched with ICDD #00-048-1615 (β-$Si_{10}Al_2O_2N_{14}$), 01-089-1498 (cBN), and 01-07708869 (hBN—hexagonal boron nitride).

Figure 3:
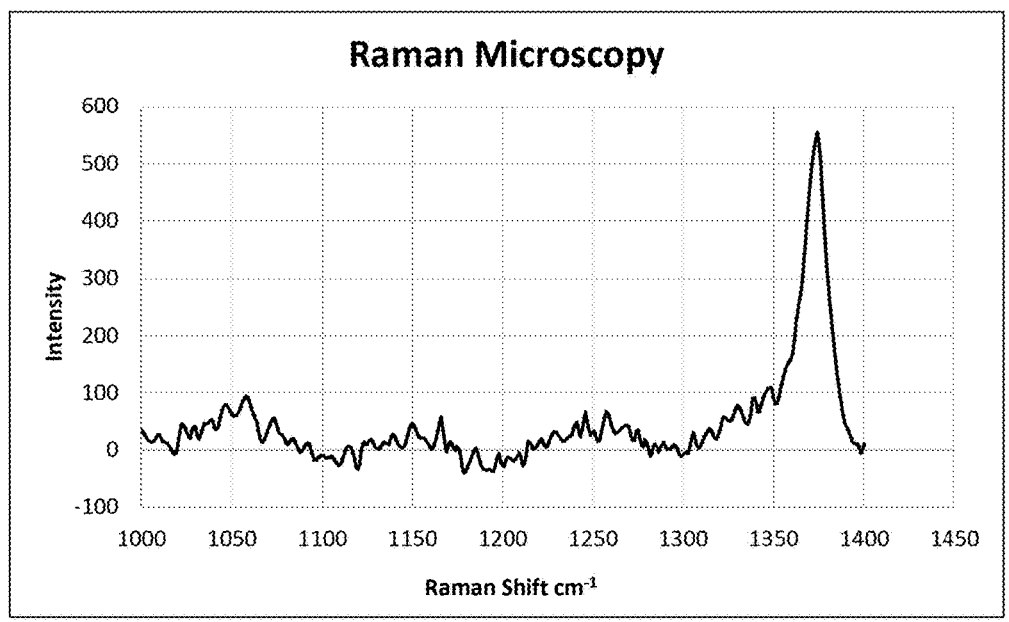
FIG. 3 is a post-sintering Raman microscopy scan of the 5-Ca-$\alpha$-7 sample, having 40 μm cBN particle embedded in a sialon matrix.

Composites reinforced with 20 μm cBN showed the presence of pure Ca-alpha-sialon ($Ca_{0.68}Si_{9.96}Al_{2.04}O_{0.68}N_{15.32}$) phase as per the designed values of m and n. Aside from the pure calcium stabilized alpha sialon phase, no evidence of cBN to hBN transition was recorded by the X-ray diffraction. However, for the 50 nm AlN samples (5-Ca-α-5 to 5-Ca-α-10), a complete alpha to beta transformation was recorded for the sialon matrix. These samples also showed a major cBN to hBN transformation as evident from the XRD pattern. The transition from cBN to hBN for the said composites was confirmed with the help of Raman microscopy, as shown in FIG. 3. This figure shows a post-sintering Raman microscopy scan of a 40 μm cBN particle embedded in a sialon matrix (sample 5-Ca-α-

7), depicting the high intensity peak characteristic of hBN. While the exact transformation mechanism of cBN to hBN is still under investigation, it is likely that during the sintering at 1500° C., the smaller particle size of the AlN precursor facilitates the transition of the stable alpha sialon phase into the beta sialon phase.

EXAMPLE 3

Results and Discussion—Microstructure Development

Figure 4A:
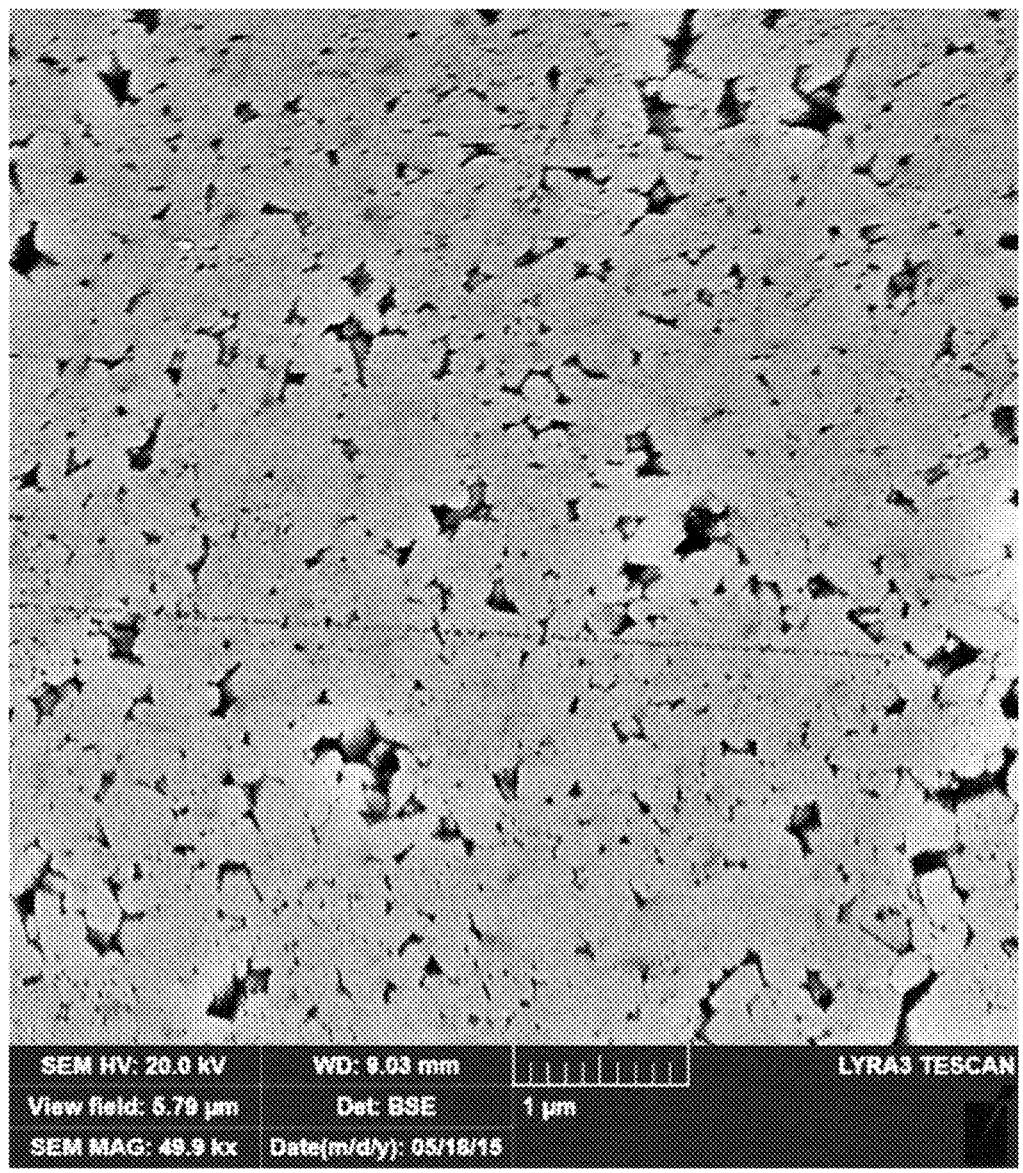
FIG. 4A is a field emission scanning electron microscope (FESEM) micrograph of an etched pure alpha sialon sample (5-Ca-$\alpha$-1).

A FESEM micrograph of an etched pure alpha sialon sample (5-Ca-α-1) is shown in FIG. 4A. Full dense single phase equiaxed alpha-sialon grains can be observed in this micrograph, which validates the existence of the single phase alpha sialon by choosing an amount of precursors according to the formula values of m=1.6 and n=1.2.

Figure 4B:
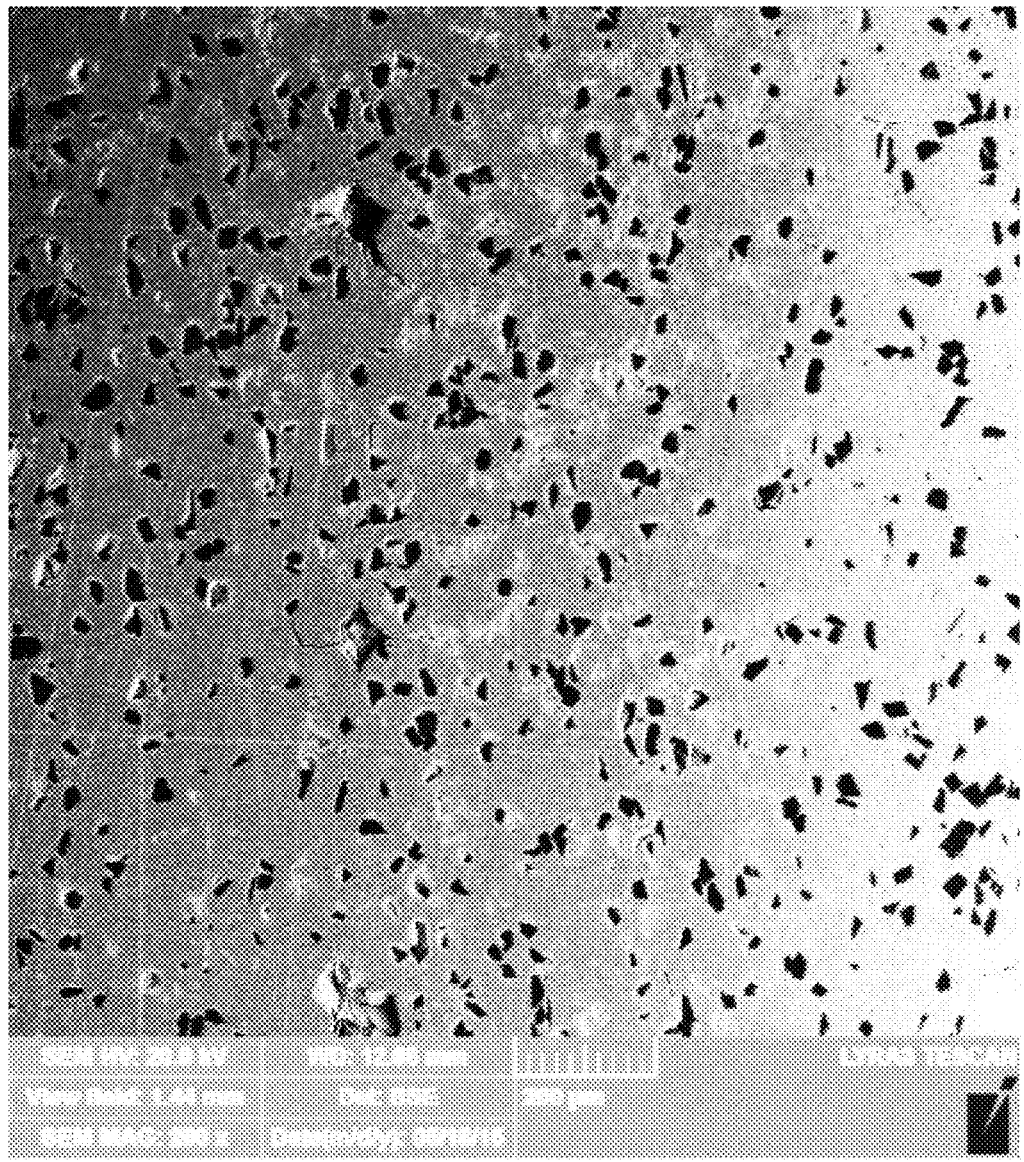
FIG. 4B is backscattered FESEM micrograph of the 5-Ca-$\alpha$-2 composite containing 10 wt % of 20 μm cBN reinforcement.

A typical backscattered FESEM micrograph of the composite containing 10 wt % of 20 μm cBN reinforcement (5-Ca-α-2) is shown in FIG. 4B. According to this micrograph, cBN and alpha-sialon can be distinguished easily due to their different mean atomic number. The cBN grains (in black contrast) are homogeneously dispersed in continuous alpha-sialon matrix, and no pore was found in all the samples.

Microstructural images of sialon composites reinforced with 30 wt % 40 μm cBN (5-Ca-α-7) are shown in FIGS. 5A and 5B. The uniform distribution of reinforcement particles within the matrix may be easily observed. FIG. 5A shows a polished surface of the sample, while an etched surface the same is depicted in FIG. 5B. The needle shaped, elongated morphology of the grains in FIG. 5B are evidence of the alpha to beta transformation of the sialon matrix. While the transformation mechanism from alpha to beta at these conditions may not be completely understood, it may be attributed to the creation of a larger amount of oxygen-rich liquids due to the smaller particle size of the aluminum nitride precursors having a higher reactivity.

EXAMPLE 3

Figure 6:
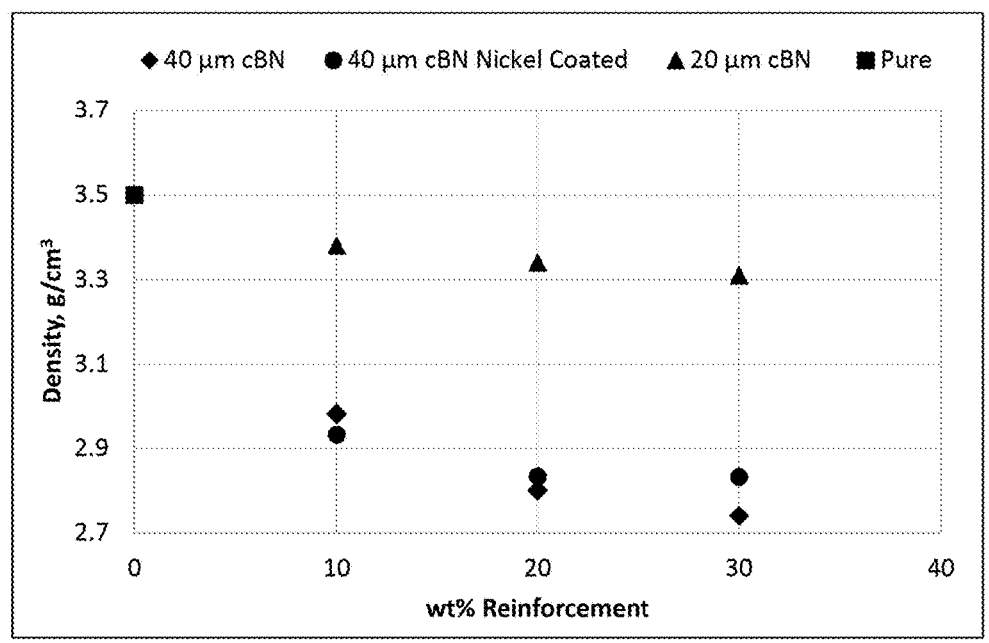
FIG. 6 is a graph showing different sample densities as a function of weight percentage and type of cBN reinforcement.

Results and Discussion—Role of cBN Particle Size and AlN Particle Size on Densification of Composites The graph in FIG. 6 depicts the trends in densities that were observed as a function of reinforcement weight percentage. Pure alpha sialon sample (5-Ca-α-1) displayed the highest density of 3.5 g/cm³. Increasing the weight percent of reinforcement lead to a slight decrease in density, where the 5-Ca-α-4 (30 wt % of 20 μm cBN) displayed a density of 3.31 g/cm³, which represents a densification of about 95% as compared to the pure alpha sialon. This negative effect of cBN on the densification has also been reported in cBN-sialon, cBN—$Al_2O_3$ and, cBN—WC—Co composites [Feng Y. et al. *Mater. Sci. Eng. A* 527 (2010) 4723-6; Hotta, M. et al. *J. Ceram. Soc. Jpn.* 116 (2008) 744-8; and Martinez, V. et al. *J. Am. Ceram. Soc.* 90 (2007) 415-24 each incorporated herein by reference in its entirety]. The heating nature of SPS, i.e. pulsed-current, aids the densification process at low sintering temperature, along with the higher surface areas associated with the nano precursors. CaO, as a densifying additive, provided an extra amount of liquid phase at the first stages of sintering, which facilitated densification. A large surface area associated with nano powder has been proven to act as the driving mechanism for sintering to gain thermal equilibrium [Groza, J. R. *Nanostruct. Mater.* 12 (1999) 987-92—incorporated herein by reference in its entirety]. The equation developed by Hansen and his group estimates that the sintering rate would be enhanced by a factor of 4 if the starting powder material size is reduced by one order of magnitude [Hansen, J. D. et al. *J. Am. Ceram. Soc.* 75 (1992) 1129-35—incorporated herein by reference in its entirety].

However, a decline in densities of alpha-sialon composites reinforced with 40 μm cBN is most likely due to the larger size of filler particles impeding the densification process. Moreover, an unusual alpha to beta phase transformation observed in the high energy ball milled samples (5-Ca-α-5 to 5-Ca-α-10) may have hindered the densification process due to the simultaneous structural changes taking place during sintering.

EXAMPLE 4

Results and Discussion—Role of cBN Particle Size and AlN Particle Size on Mechanical Characteristics Table 2 summarizes the results of mechanical testing for the pure sialon as well as sialon reinforced cBN composites. For the samples prepared via sonication route (5-Ca-α-1 to 5-Ca-α-4), addition of cBN strengthens the matrix as indicated by the increase in Vickers hardness values. With increasing the weight percent of 20 μm cBN to 30 wt %, the Vickers hardness increases up to 24.01 GPa, as compared to the hardness of 21.06 GPa for the pure alpha sialon matrix. However, while increasing the weight percent of 20 μm cBN, the fracture toughness was found to decrease.

The composites prepared by employing AlN of 50 nm particle size (5-Ca-α-5 to 5-Ca-α-10) showed a decrease in hardness values upon addition of 40 μm cBN when compared to the pure alpha-sialon matrix. This decrease in hardness values results from the unanticipated phase transformations of both alpha to beta sialon as well as cBN to hBN. However, an increase in fracture toughness values for the said samples is a typical result of the elongated morphology of beta-sialon grains. Composites reinforced with nickel-coated cBN particles (5-Ca-α-8 to 5-Ca-α-10) display a more promising fracture toughness due to a much smoother interface between the reinforcement and the matrix.

Cubic boron nitride (cBN) reinforced sialon composites prepared via probe sonication, were sintered by SPS at 1500° C. for 30 minutes under a constant pressure of 50 MPa. The cBN particles could be evenly dispersed in the sialon matrix with this ultra-sonication technique. Using a smaller size of precursor particles resulted in an unanticipated phase transformation from alpha to beta sialon. Particles of cBN (20 μm) may be embedded in the alpha sialon matrix as a way to produce composites achieving hardness values as high as 24.01 GPa with a moderate fracture toughness of about 5.67 MPa√m. The transformation mechanism from alpha to beta sialon, triggered by the smaller size of aluminum nitride precursor, is being investigated.

TABLE 2

Mechanical Properties of the Samples.

| Sample ID | Hardness - $HV_{10}$ (GPa) | Fracture Toughness (MPa√m) |
| --- | --- | --- |
| 5-Ca-α-1 | 21.06 | 7.29 |
| 5-Ca-α-2 | 21.84 | 9.03 |
| 5-Ca-α-3 | 23.10 | 6.70 |
| 5-Ca-α-4 | 24.01 | 5.67 |
| 5-Ca-α-5 | 15.5 | 7.95 |
| 5-Ca-α-6 | 11.6 | 11.51 |

TABLE 2-continued

Mechanical Properties of the Samples.

| Sample ID | Hardness - $HV_{10}$ (GPa) | Fracture Toughness (MPa$\sqrt{m}$) |
|---|---|---|
| 5-Ca-α-7 | 9.4 | 12.46 |
| 5-Ca-α-8 | 13.5 | 10.35 |
| 5-Ca-α-9 | 11.2 | 11.57 |
| 5-Ca-α-10 | 8.3 | 12.97 |

The invention claimed is:

1. A method for producing a composite of cubic boron nitride (cBN) dispersed in a SiAlON ceramic, the method comprising:
mixing
silicon nitride nanoparticles,
aluminum nitride nanoparticles,
silica nanoparticles,
calcium oxide nanoparticles, and
cubic boron nitride (cBN) microparticles to produce a mixture, and
sintering the mixture to produce the composite.

2. The method of claim 1, wherein the mixing involves sonication.

3. The method of claim 1, wherein the mixing involves ball milling.

4. The method of claim 1, wherein the cBN microparticles have a largest linear dimension of 10-50 μm and are present in the mixture at a weight percentage of 5-40 wt %, relative to a total weight of the mixture.

5. The method of claim 4, wherein the mixture comprises nickel, the nickel located on an exterior surface of the cBN microparticles.

6. The method of claim 5, wherein the cBN microparticles are coated with nickel and comprise 20-80 wt % nickel, based on a total weight of the cBN microparticles.

7. The method of claim 6, wherein the composite has a higher fracture toughness than an otherwise identical composite sintered from cBN microparticles that do not have nickel.

8. The method of claim 1, wherein the silicon nitride nanoparticles comprise α-$Si_3N_4$.

9. The method of claim 1, wherein the aluminum nitride nanoparticles have a longest linear dimension of 30-120 nm.

10. The method of claim 1, wherein the aluminum nitride nanoparticles have a longest linear dimension of 30-70 nm.

11. The method of claim 10, wherein the composite has a higher fracture toughness than an otherwise identical composite produced from other aluminum nitride nanoparticles having a longest linear dimension of 85-500 nm.

12. The method of claim 10, wherein at least 75 wt % of the SiAlON ceramic is in a β phase, relative to a total weight of the SiAlON ceramic.

13. The method of claim 10, wherein the composite comprises boron nitride, and 40-95 wt % of the boron nitride relative to a total weight of the boron nitride is hexagonal boron nitride (hBN) as determined by XRD and/or Raman spectroscopy.

14. The method of claim 1, wherein the sintering is a spark plasma sintering process.

15. The method of claim 1, wherein the sintering is performed at a temperature ranging from 1400-1600° C.

16. The method of claim 1, wherein the sintering comprises heating the mixture at a rate ranging from 5-600° C./min.

17. The method of claim 1, wherein the sintering comprises heating the mixture at a rate ranging from 90-110° C./min.

18. The method of claim 1, wherein the sintering comprises applying a uniaxial pressure ranging from 30-80 MPa to the mixture.

19. The method of claim 1, wherein the composite has a Vickers hardness ($HV_{10}$) of 8-25 GPa.

20. The method of claim 1, wherein the composite has a fracture toughness of 5-13 MPa$\sqrt{m}$.

* * * * *